(12) United States Patent
Aarskog et al.

(10) Patent No.: US 9,742,163 B2
(45) Date of Patent: Aug. 22, 2017

(54) SUBSEA SWITCHGEAR (71) Applicant: Siemens Aktiengesellschaft, Munich (DE)

(72) Inventors: Fredrik Gundersen Aarskog, Oslo (NO); Kjell Erik Fossen, Trondheim (NO)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 15/318,464

(22) PCT Filed: Aug. 12, 2014

(86) PCT No.: PCT/EP2014/067257
§ 371 (c)(1),
(2) Date: Dec. 13, 2016

(87) PCT Pub. No.: WO2015/197140
PCT Pub. Date: Dec. 30, 2015

(65) Prior Publication Data
US 2017/0155233 A1    Jun. 1, 2017

(30) Foreign Application Priority Data
Jun. 27, 2014  (EP) .................................... 14174817

(51) Int. Cl.
*F24H 1/10* (2006.01)
*H02B 7/06* (2006.01)
(Continued)

(52) U.S. Cl.
CPC .............. *H02B 7/06* (2013.01); *F16L 53/005* (2013.01); *H01H 47/22* (2013.01); *H01H 51/29* (2013.01); *H02J 4/00* (2013.01)

(58) Field of Classification Search
None
See application file for complete search history.

(56) References Cited

U.S. PATENT DOCUMENTS

| 2004/0149446 A1 | 8/2004 | Appleford et al. |
| 2006/0131143 A1 | 6/2006 | Eriksson et al. |

(Continued)

FOREIGN PATENT DOCUMENTS

| EP | 1373682 A1 | 1/2004 |
| EP | 1963616 A1 | 9/2008 |

(Continued)

OTHER PUBLICATIONS

International Search Report PCT/ISA/210 for International Application No. PCT/EP2014/067257 Dated Sep. 23, 2015.
(Continued)

*Primary Examiner* — Thor Campbell
(74) *Attorney, Agent, or Firm* — Harness, Dickey & Pierce, P.L.C.

(57) ABSTRACT

A subsea switchgear for switching the power supply to plural subsea loads includes a subsea enclosure, to allow the deployment of the subsea switchgear at a subsea location; a power input for receiving AC electrical power from a power source; at least two power outputs for giving out AC electrical power; and a power distribution bus for distributing the received AC electrical power to the at least two power outputs. In at least one embodiment, between each power output and the power distribution bus, a contactor is connected which is controllable to connect or disconnect the respective power output from the power distribution bus.

35 Claims, 3 Drawing Sheets

(51) Int. Cl.
    *H01H 51/29*     (2006.01)
    *H01H 47/22*     (2006.01)
    *F16L 53/00*     (2006.01)
    *H02J 4/00*     (2006.01)

(56) References Cited

U.S. PATENT DOCUMENTS

| | | |
|---|---|---|
| 2009/0009931 A1 | 1/2009 | Rocke |
| 2009/0226262 A1 | 9/2009 | Karstad et al. |
| 2013/0286546 A1 | 10/2013 | Hazel et al. |
| 2013/0300491 A1 | 11/2013 | Boe et al. |
| 2013/0342294 A1 | 12/2013 | Aarskog |
| 2014/0097678 A1 | 4/2014 | Thibaut et al. |
| 2014/0098468 A1 | 4/2014 | Boe |

FOREIGN PATENT DOCUMENTS

| | | |
|---|---|---|
| EP | 2011960 A2 | 1/2009 |
| EP | 2567391 A1 | 3/2013 |
| EP | 2680288 A1 | 1/2014 |
| EP | 2717401 A1 | 4/2014 |
| WO | WO-2012164029 A2 | 12/2012 |

OTHER PUBLICATIONS

International Preliminary Report on Patentability dated Aug. 16, 2016.

SUBSEA SWITCHGEAR

PRIORITY STATEMENT

This application is the national phase under 35 U.S.C. §371 of PCT International Application No. PCT/EP2014/067257 which has an International filing date of Aug. 12, 2014, which designated the United States of America and which claims priority to European patent application number EP14174817.8 filed Jun. 27, 2014, the entire contents of which are hereby incorporated herein by reference.

FIELD

An embodiment of the invention generally relates to a subsea switchgear for switching the supply of electric power to plural subsea loads. An embodiment of the invention further generally relates to a method of operating a subsea switchgear.

BACKGROUND

Due to the increasing energy demand, offshore oil and gas production is moving into deeper waters. Wells for hydrocarbon production can be located in water depths down to 3,000 m or more and a considerable distance from shore. For ensuring an efficient and secure production, processing facilities are being installed at the ocean floor in proximity to such subsea well. Installations on the ocean floor can comprise a range of components, including pumps, compressors and the like which require electric power for operation. Power supply can occur by way of a subsea power grid installed on the ocean floor, which may for example comprise a subsea transformer, a subsea switchgear, and a subsea variable speed drive (VSD) for powering subsea loads.

In order to be capable of powering the subsea installation, voltage is supplied at a high voltage level to the subsea transformer and then transformed to a distribution voltage level, which may for example be about 36 kV. In such example, the switchgear provides 36 kV distribution and switching, which has to occur by means of vacuum circuit breakers. In particular, the switchgear is required to be capable of breaking a short circuit current so that in case of a fault in a subsea load, the faulty load can be disconnected from the subsea power grid. The cables and connectors used between the different components of the subsea installation are rated for the distribution voltage, e.g. for the above-mentioned 36 kV.

When installed subsea, the components of the subsea power grid are exposed to pressures up to or even in excess of 300 bar (at a depth of 3,000 m). To protect the components from the corrosive environment of the surrounding seawater and to deal with the high pressures, pressure resistant enclosures or pressure compensated enclosures can be used. In particular for vacuum circuit breakers provided in a switchgear, pressure resistant enclosures need to be used. They need to have thick walls to withstand the high differential pressure between the subsea environment and the inside of the enclosure.

Accordingly, the switchgear, as well as the other modules such as subsea transformer or variable speed drive are relatively heavy and large sized. Furthermore, they are relatively expensive to produce. In particular for smaller loads, the supply with electric power via components of such subsea power grid might be expensive, and might require these relatively big and heavy modules.

To power such small individual consumers, it is known to provide a single power supply cable, for example from a topside installation, such as an offshore platform or an onshore facility. Although such solution does not require the relatively expensive and heavy subsea components, it requires a subsea cable or an umbilical for each load, which, depending on the length, can also be expensive and difficult to install.

It is desirable to be capable of selectively powering relatively small individual consumers of a subsea installation, which can be located at different positions subsea, without the need for such cables or the above mentioned expensive and heavy subsea components.

SUMMARY

Accordingly, there is a need to improve the power supply to plural loads located subsea, and in particular to provide a cost-efficient power supply and switching of such loads.

The claims describe embodiments of the invention.

An embodiment of the invention provides a subsea switchgear for switching on and off the power supply to plural subsea loads. The subsea switchgear comprises a subsea enclosure configured to allow the deployment of the subsea switchgear at a subsea location, a power input for receiving AC electrical power from a power source, at least two power outputs for giving out AC electrical power, and a power distribution bus for distributing the received AC electrical power to the at least two power outputs. Between each power output and the power distribution bus, a contactor is connected which is controllable to connect or disconnect the respective power output from the power distribution bus.

A further embodiment of the invention provides a pipeline heating system comprising a subsea switchgear in any of the above-described configurations. The pipeline heating system further comprises plural heating units, each for heating a pipeline section. A heating unit may be connected to each power output of the subsea switchgear. A relatively large length of pipeline may thus be heated from a relatively weak power supply, for example by subsequently heating single pipeline sections by switching the subsea switchgear correspondingly (i.e. by controlling the switching state of the contactors).

A further embodiment of the invention provides a subsea power distribution system for distributing electrical power to plural subsea loads, the subsea loads comprising electric motors, wherein the subsea power distribution system comprises a subsea switchgear in any of the above described configurations. Plural electric submersible pumps (ESPs) may for example be powered from such subsea power distribution system. In other embodiments, the subsea power distribution system may, additionally or alternatively, power other types of loads, such as the above mentioned heating units, subsea pumps, subsea compressors or the like.

In an embodiment, a method of operating a subsea switchgear is provided. The method comprises receiving AC electrical power at a power input; distributing AC electrical power to two or more power outputs by way of a power distribution bus; and switching the power supply to the power outputs by way of a contactor connected between the respective power output and the power distribution bus. By means of such method, advantages similar to the ones outlined further above may be achieved.

It is to be understood that the features mentioned above and those yet to be explained below can be used not only in the respective combinations indicated, but also in other combinations or in isolation, without leaving the scope of the present invention. In particular, embodiments of the method may comprise steps described with respect to the subsea switchgear, the pipeline heating system or the subsea power distribution system.

BRIEF DESCRIPTION OF THE DRAWINGS

The foregoing and other features and advantages of the invention will become further apparent from the following detailed description read in conjunction with the accompanying drawings. In the drawings, like reference numerals refer to like elements.

DETAILED DESCRIPTION OF THE EXAMPLE EMBODIMENTS

An embodiment of the invention provides a subsea switchgear for switching on and off the power supply to plural subsea loads. The subsea switchgear comprises a subsea enclosure configured to allow the deployment of the subsea switchgear at a subsea location, a power input for receiving AC electrical power from a power source, at least two power outputs for giving out AC electrical power, and a power distribution bus for distributing the received AC electrical power to the at least two power outputs. Between each power output and the power distribution bus, a contactor is connected which is controllable to connect or disconnect the respective power output from the power distribution bus.

By such arrangement, plural subsea loads can be supplied with electric power in an effective and cost efficient way. By using contactors for switching, the subsea switchgear can be made relatively compact and can be produced cost efficiently. In particular, the contactor is operable in a high pressure environment, so that the subsea switchgear can be pressure compensated, i.e. pressure balanced to the ambient pressure, so that a relatively compact and light weight enclosure may be used.

In an embodiment, the contactor is submerged in a dielectric liquid. This may increase the breakdown strength and may further allow the use of a pressure compensated design for the subsea switchgear, thus enabling a relatively compact and simple design of the subsea switchgear which is cost efficient to produce.

In particular, the electrical contacts of the contactor may be submerged in the dielectric liquid, i.e. the electrical contacts of the contactor that are used for switching (which may be termed switching contacts) may be submerged in the dielectric liquid and may be directly exposed to the dielectric liquid.

In an embodiment, the subsea enclosure is a pressure compensated enclosure filled with a dielectric liquid which has an internal pressure that is balanced to the pressure of the medium surrounding the subsea enclosure, such as seawater. Pressure balancing may occur by means of a pressure compensator, which may be mounted to the subsea enclosure or form part thereof.

In other embodiments, the subsea enclosure may be a pressure resistant enclosure maintaining a pressure below 5 bar inside, e.g. a close to atmospheric pressure, e.g. about 1 bar or about 1.5 bar.

In an embodiment, the contactor is a bistable contactor, in particular a latched contactor which is latchable in the closed position. Accordingly, the power consumption of the switchgear may be reduced during operation. As an example, a solenoid that is used for switching the contactor may not need to be energized for holding the contactor in the closed position, thus saving energy during operation.

In an embodiment, the contactor is a solenoid contactor. The respective power output may thus be connected or disconnected fast and efficiently.

In an embodiment, the subsea switchgear provides power distribution for three phase AC electric power, wherein the power input is a three phase power input, wherein each power output is a three phase power output. Two or three contactors may be provided for each power output to allow connection or disconnection of two or three phases, respectively, of the respective power output. Providing two contactors per power output has the advantage that the disconnection of two of three phases may be sufficient to disconnect a load in a three phase system, thus making the subsea switchgear more cost efficient and more compact. Providing three contactors per power output has the advantage that a save disconnection of all phases of the power output becomes possible.

Further, the power distribution bus may be configured for three phase AC power distribution. It may for example comprise three busbars. A terminal of each contactor may then be connected to the respective busbar.

In an embodiment, the contactors are located in a chamber filled with dielectric liquid, in particular with an ester-based dielectric liquid, such as Midel, or an oil, such as silicone oil or transformer oil. All contactors may be located within the same chamber, which may for example be provided by the subsea enclosure or by a further enclosure located (at least partly) within the subsea enclosure. Contactors may also be provided in individual chambers, or groups of contactors may each be provided in the same chamber.

In an embodiment, the subsea switchgear comprises for each power output a chamber in which the contactor for the power output is arranged and which is filled with dielectric liquid, in particular with an ester-based dielectric liquid or an oil, as mentioned above. This means that for a three phase power system, the two or three contactors of the respective power output may be arranged within the same chamber for the respective power output. By providing separate chambers for each power output, it may be prevented that contamination within the liquid can spread from one chamber to another chamber, so that a clean environment for the contactors is ensured. Such contamination of the liquid may for example be caused by arcing, which might in some situations occur during switching, or may be caused by the occurrence of a fault.

In an embodiment, the chamber is provided by an intermediate enclosure located at least partly inside the subsea enclosure. A double barrier configuration against surrounding seawater may thus be achieved, and a clean environment for the respective contactor(s) can be ensured.

In an embodiment, the intermediate enclosure comprises a flexible portion, in particular a liquid tight or liquid permeable membrane, which provides pressure compensation between the inside of the intermediate enclosure and the inside of the subsea enclosure. Accordingly, a pressure compensated configuration can be employed in which the external subsea pressure prevails both in the subsea enclosure and in the intermediate enclosure. A compact and relatively lightweight switchgear may thus be obtained. Further, if a permeable membrane is implemented, it may serve as a filter to prevent contamination/pollution from entering the intermediate chamber.

In an embodiment, the chamber comprises the contactors for all phases of the respective power output.

In an embodiment, the intermediate chamber comprises an electrical feedthrough for each phase of the respective power output. The feedthrough reaches from the inside of the intermediate chamber to the inside of the subsea enclosure, so that an electrical connection can be provided from the power distribution bus to the respective contactor in the intermediate chamber via the feedthrough. The feedthrough may be provided by bushings.

In an embodiment, the subsea enclosure comprises an output penetrator and/or an output connector for each power output. In an embodiment, the subsea enclosure comprises an input penetrator and/or an input connector for the power input. Connection of the subsea switchgear to other subsea equipment may thus be facilitated. As an example, a wet mateable connector may be provided for the power input and for one or more of the power outputs to allow the engaging and disengaging of the respective connections while the subsea switchgear is installed at the subsea location.

If the subsea enclosure is a pressure resistant enclosure, the penetrator may provide the feedthrough for the high differential pressure barrier provided by the subsea enclosure.

In an embodiment, the subsea switchgear is adapted to distribute AC electric power at a voltage level within the range of about 500 V to about 10,000 V, in particular of about 1,000 V to about 7,000 V. As an example, the input voltage and the output voltage of the subsea switchgear may be about 6,600 V. By being operable in these voltage ranges, the subsea switchgear may supply electric power to heating systems for pipelines or to small loads such as electric motors of electric submersible pumps (EPSs) or the like.

In an embodiment, the contactor is a no-load contactor adapted to be operated only when the power supply to the subsea switchgear is disconnected. The contactor can thus have a relatively simple and compact configuration, which may further reduce the size and the cost of the subsea switchgear.

In an embodiment, the subsea switchgear is configured to directly supply the AC electrical power received at the power input to the respective power output without any conversion. The subsea switchgear thus essentially only requires the power distribution bus and the contactors for distributing and switching the power. A compact and cost efficient configuration is thus achieved.

In an embodiment, the subsea switchgear does not comprise any power conversion device such as a transformer or a frequency converter or a variable frequency drive. In another embodiment, the subsea switchgear does not comprise a vacuum circuit breaker.

In an embodiment, the subsea switchgear further comprises a control unit adapted to control the switching state of the contactors. Such control unit may be arranged within the subsea enclosure, for example in an own enclosure that may be pressure resistant or pressure compensated. The control unit may also be arranged outside the subsea enclosure in its own subsea enclosure, it may for example form part of a separate subsea control module. In other embodiments, the control unit may be located topside. In some embodiment, the control unit may have components located subsea and components located topside.

The control unit may be configured to have a mode of operation in which it controls the contactors so as to connect the power input subsequently to a different power output for a predetermined amount of time, while the remaining power outputs are disconnected from the power input. With such control, it becomes possible to subsequently supply individual subsea loads with electric power. This is for example advantageous when the supplied electric power is only sufficient to operate one of the connected loads. The control unit may further be configured to disconnect the power supply to the power input prior to switching so that the switching of the contactors can occur in a no load condition.

The power supply may for example be obtained from a further, larger subsea switchgear which is capable of switching on load, for example by way of vacuum circuit breakers. It may also be obtained from a subsea transformer or directly from topside, e.g. via a subsea cable or an umbilical.

A further embodiment of the invention provides a pipeline heating system comprising a subsea switchgear in any of the above-described configurations. The pipeline heating system further comprises plural heating units, each for heating a pipeline section. A heating unit may be connected to each power output of the subsea switchgear. A relatively large length of pipeline may thus be heated from a relatively weak power supply, for example by subsequently heating single pipeline sections by switching the subsea switchgear correspondingly (i.e. by controlling the switching state of the contactors).

A further embodiment of the invention provides a subsea power distribution system for distributing electrical power to plural subsea loads, the subsea loads comprising electric motors, wherein the subsea power distribution system comprises a subsea switchgear in any of the above described configurations. Plural electric submersible pumps (ESPs) may for example be powered from such subsea power distribution system. In other embodiments, the subsea power distribution system may, additionally or alternatively, power other types of loads, such as the above mentioned heating units, subsea pumps, subsea compressors or the like.

In an embodiment, a method of operating a subsea switchgear is provided. The method comprises receiving AC electrical power at a power input; distributing AC electrical power to two or more power outputs by way of a power distribution bus; and switching the power supply to the power outputs by way of a contactor connected between the respective power output and the power distribution bus. By means of such method, advantages similar to the ones outlined further above may be achieved.

In an embodiment, the method is performed by a subsea switchgear in any of the above described configurations.

In the following, embodiments of the invention will be described in detail with reference to the accompanying drawings. It is to be understood that the following description of the embodiments is given only for the purpose of illustration and is not to be taken in a limiting sense.

It should be noted that the drawings are to be regarded as being schematic representations only, and elements in the drawings are not necessarily to scale with each other. Rather, the representation of the various elements is chosen such that their function and general purpose become apparent to a person skilled in the art. It is also to be understood that the physical or functional units illustrated and described herein with respect to the different embodiments do not necessarily need to be implemented as physically separate units. One or more physical or functional blocks or units may be implemented in a common circuit, chip, circuit element or unit, while other physical or functional blocks or units shown may be implemented in separate circuits, chips, circuit elements or units.

Figure 1:
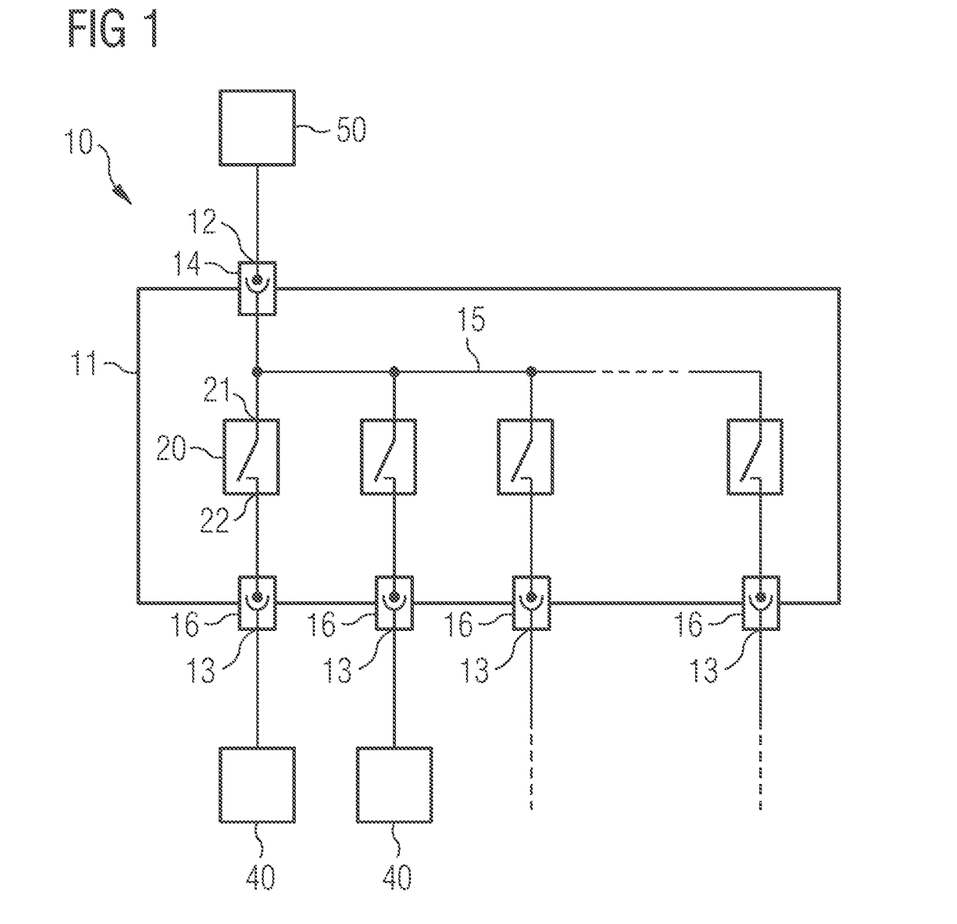
FIG. 1 is a schematic drawing showing a subsea switchgear according to an embodiment of the invention.

FIG. 1 shows a subsea switchgear 10 having a power input 12, four power outputs 13, a subsea enclosure 11 and a power distribution bus 15. It should be clear that in other embodiments, more or fewer power outputs 13 may be provided, for example a total of 2, 3, 5, 6 or more power outputs 13.

The feedthrough through the wall of the enclosure 11 is for each power output 13 provided by the connector or penetrator 16, which leads the electrical connection through the wall of the subsea enclosure 11.

The subsea enclosure 11 is pressure compensated, it comprises a pressure compensator (not shown) that balances the pressure inside enclosure 11 to a pressure prevailing outside enclosure 11, for example in the subsea environment, i.e. the surrounding seawater, when subsea switchgear 10 is installed at the ocean floor. For pressure balancing, the pressure compensator may for example use a bellows, bladder or membrane which transmits pressure and allows the volume of a dielectric liquid filling enclosure 11 to change.

Between each power output 13 and the power distribution bus 15, a contactor 20 is connected. The contactor 20 has a first terminal 21 that is connected to the power distribution bus 15 and a second terminal 22 that is connected to the power output 13. Contactor 20 can be switched to an open state in which the power output 13 is disconnected from the power distribution bus 15 and can be switched into a closed state in which the power output 13 is electrically connected to power distribution bus 15.

Note that the subsea switchgear may switch three phase AC electrical power, so that for each power output, two or three contactors 20 may be provided for switching two or three phases of the respective power output 13. Power input may thus be a three phase power input and each power output 13 may be a three phase power output.

Contactors are usually not suitable for operation at higher voltages. The contactor 20 is disposed in a dielectric liquid, in particular an ester-based dielectric liquid such as Midel or in oil. By such configuration, the contactor 20 can be operated at higher voltages, e.g. up to 7,000 V or even up to 10,000 V. The contactor 20 may be configured to be operable at a current above 1,000 A, e.g. up to 1250 A, up to 2000 A or even above. The contactor 20 is configured to operate under a no-load condition, i.e. the power to the contactor 20 is disconnected before the contactor 20 is opened.

Power input 12 is connected to a power source 50 which can be located subsea or topside. It may for example be connected to the power output of a conventional subsea switchgear, which may for example provide an AC voltage of about 5,000 to about 10,000 V (three phase AC). The subsea switchgear 10 may also be connected to a topside power source located on a vessel, such as a floating platform, a fixed platform, a ship or an onshore installation. The power source may comprise a breaker for switching the power supply to subsea switchgear 10 so that the contactors 20 can be operated in a no-load condition. Subsea switchgear 10 may for example be operated as a changeover switch for supplying different subsea loads 40 with electric power from a single power source 50.

For operating the contactors 20, the subsea switchgear 10 may comprise a controller (not shown) which controls the supply of electric power to solenoids of the contactors 20 for switching. Such controller may in some embodiments be located within the subsea enclosure 11, it may in other embodiments be located in a separate subsea control module or it may be located topside.

Figure 2:
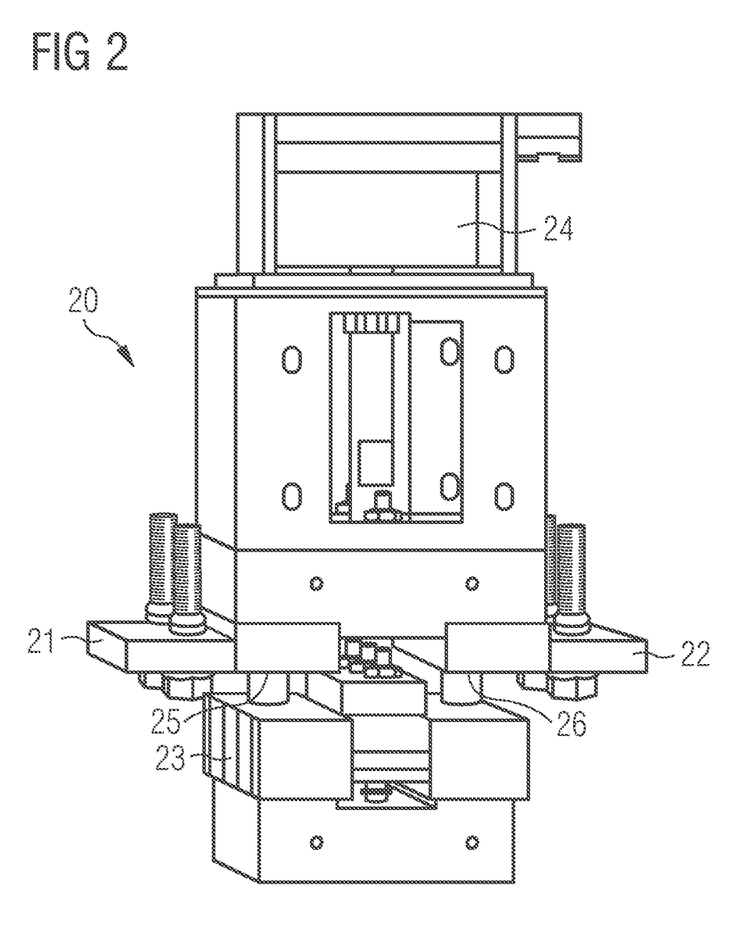
FIG. 2 is a schematic drawing showing a contactor that may be used in the subsea switchgear of FIG. 1.

FIG. 2 shows a contactor 50 which may be used with embodiments of the present invention, and in particular with the subsea switchgear 10 of FIG. 1. The contactor 20 has a first terminal 21 and a second terminal 22 for electrically connecting the contactor. The terminals 21, 22 can be provided by busbar sections, in particular copper bar sections, to which another busbar section can be mounted, e.g. by screws or bolts, such as a busbar section of power distribution bus 15. The terminals 21, 22 are electrically connected to fixed contacts 25, 26, respectively, which are stationary contacts and which can be provided in the form of contact discs or contact pads or the like.

A movable contact 23 can be moved between an open position (which is illustrated) and a closed position. In the open position, the movable contact is spaced apart from fixed contacts 25, 26, so that there is no electrical connection between the terminals 21, 22. The contactor 20 comprises a solenoid 24 which can be energized (e.g. by the controller) to move the movable contact 23 into a closed position in which the movable contact 23 established an electrical connection between the fixed contacts and thus between the terminals 21, 22. The movable contact 23 and the fixed contacts 25, 25 may be referred to as switching contacts of contactor 20.

The contactor 20 may further comprise a latch to secure the movable contact 23 in the closed position. Accordingly, the contactor 20 can be kept in the closed position even if the solenoid 24 is no longer supplied with electric energy.

The contactor is submerged in dielectric liquid. The dielectric liquid has improved breakdown strength, so that the contactor 20 can be operated at higher voltages than a conventional contactor. In particular, the switching contacts (e.g. the movable contact 23 and the fixed contacts 25, 26) of contactor 20 are submerged in a dielectric liquid. Accordingly, in the open position of movable contact 23, dielectric liquid will be present in the space between the movable contact 23 and the fixed contacts 25, 26, thus increasing the breakdown strength.

Figure 3:
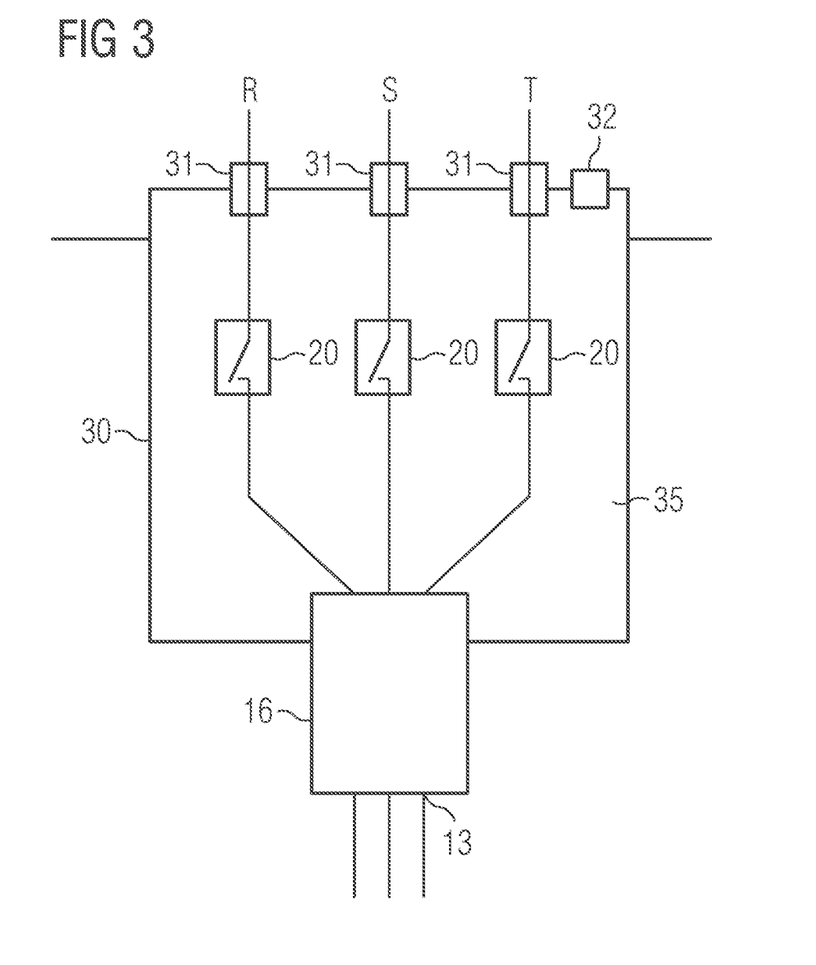
FIG. 3 is a schematic drawing showing an implementation of the contactor arrangement for a power output of the subsea switchgear of FIG. 1.

FIG. 3 shows a particular implementation of the power outputs 13 and the respective contactors 20 of the subsea switchgear 10. Three contactors 20 are provided for each power output 13, one for each phase R, S, T of the electrical power output 13. In other embodiments, only two contactors may be provided per power output 13, e.g. for switching two phases of a three phase system.

The contactors 20 for the same power output 13 are located within in a chamber 35 of the intermediate enclosure which is at least partly arranged within the subsea enclosure 11. In some embodiments, intermediate enclosure 30 may completely be located within the subsea enclosure 11. In other embodiments, part of the intermediate enclosure 30 may be located within the subsea enclosure 11, and part of the intermediate enclosure 30 may be directly in contact with seawater when the subsea switchgear 10 is installed subsea.

For leading the electrical connections from the power distribution bus 15 into the chamber 35, bushings 31 are provided in a wall of intermediate enclosure 30, one bushing 31 for each phase R, S, and T. Intermediate enclosure 30 is furthermore pressure compensated, it is in particular pressure balanced against the inside of subsea enclosure 11. For this purpose, it comprises a flexible portion 32 which is a flexible wall section. It may for example be a liquid tight or liquid permeable membrane, or a bellows or bladder pressure compensator. Accordingly, since subsea enclosure 11 is a pressure compensated enclosure, the ambient water pressure will prevail in subsea enclosure 11 when subsea switchgear 10 is installed subsea. Since chamber 35 is pressure balanced against the inside of subsea enclosure 11 by means of flexible portion 32, the ambient water pressure will also prevail in the intermediate enclosure 30. In consequence, the differential pressure across the walls of subsea enclosure 11 and of intermediate enclosure 30 is relatively low, e.g. smaller than 5 bar, preferably smaller than 1 bar even when the subsea switchgear is installed at a water depth of up to 3,000 m or even more. Subsea enclosure and intermediate enclosure 30 can thus have relatively thin walls and can be made compact and light-weight, compared to the enclosures of conventional switchgears. Further, they can be produced cost-efficiently.

Chamber 35 is in some embodiments a hermetically sealed chamber. In other embodiments, the flexible portion 32 is a permeable membrane, in particular a filter membrane, which allows fluid exchange between the chamber 35 and the chamber inside the subsea enclosure 11. An effective pressure balancing is thus achieved, while the filter membrane will prevent contamination and particles which may pollute the dielectric liquid filling the subsea enclosure 11 from entering the chamber 35. A reduced risk of a malfunction of contactors 20 and an increased lifetime of the subsea switchgear 10 may thus be achieved.

The penetrator 16 penetrates a wall of the intermediate enclosure 30 and leads the electrical connections out of chamber 35 towards the connected load 40. In other embodiments, further bushings may be provided in intermediate enclosure 30, and the penetrator 16 is provided in a wall of subsea enclosure 11, as illustrated in FIG. 1.

As mentioned above, the contactors 20 are configured to disconnect the load 40 when current and voltage applied to contactor 20 is about zero (no load), meaning that if a fault occurs in a load, a separate protection mechanism may be provided for breaking the fault current, e.g. a vacuum breaker in a further (larger) subsea switchgear or a topside breaker. Each load may be operated at a voltage of more than kV, for example at 6.6 kV or even higher. The subsea switchgear is in some embodiments capable of handling a current of more than 1,000 A, for example of up to 1,250 A or even higher. In some embodiments, the subsea enclosure 11 can be designed to withstand the full subsea pressure, having for example a 1 atm dielectric liquid filled environment inside. In other embodiments, as described above, it can be dielectric liquid filled and pressure compensated. For the subsea switchgear 10, a relatively simple logic and control can be used for operation. For this reason and due to the use of contactors, the design of the overall subsea switchgear can be kept relatively simple and it is cost efficiently to produce compared to a conventional subsea switchgear.

While specific embodiments are disclosed herein, various changes and modifications can be made without departing from the scope of the invention. The present embodiments are to be considered in all respects as illustrative and non-restrictive, and all changes coming within the meaning and equivalency range of the appended claims are intended to be embraced therein.

The invention claimed is:

1. A subsea switchgear, comprising:
a subsea enclosure configured to allow the deployment of the subsea switchgear at a subsea location;
a power input to receive AC electrical power from a power source;
at least two power outputs to give out AC electrical power;
a power distribution bus to distribute the received AC electrical power to the at least two power outputs; and
a plurality of contactors, at least one of the plurality of contactors being connected between a respective one of the at least two power outputs and the power distribution bus, each of the plurality of contactors being controllable to connect or disconnect the respective one of the at least two power outputs from the power distribution bus wherein the plurality of contactors are solenoid contactors and wherein the plurality of contactors are submerged in a dielectric liquid.

2. The subsea switchgear of claim 1, wherein the subsea switchgear is configured to provide power distribution for three phase AC electric power, wherein the power input is a three phase power input, wherein each of the at least two power outputs is a three phase power output, and wherein two or three contactors are provided for each of the at least two power outputs to allow connection or disconnection of two or three phases, respectively, of said at least two power outputs.

3. The subsea switchgear of claim 1, wherein the plurality of contactors are located in a chamber filled with dielectric liquid.

4. The subsea switchgear of claim 1, wherein the subsea switchgear comprises, for each of the at least two power outputs, a chamber in which the respective contactor for the respective one of the at least two power outputs is arranged and which is filled with dielectric liquid.

5. The subsea switchgear of claim 3, wherein the chambers are provided by an intermediate enclosure located at least partly inside the subsea enclosure.

6. The subsea switchgear of claim 5, wherein the intermediate enclosure comprises a flexible portion to provide pressure compensation between an inside of the intermediate enclosure and an inside of the subsea enclosure.

7. The subsea switchgear of claim 4, wherein the chambers comprises the respective contactors for all phases of the respective one of the at least two power outputs.

8. The subsea switchgear of claim 1, wherein the subsea enclosure comprises at least one of an output penetrator and an output connector for each one of the at least two power outputs.

9. The subsea switchgear of claim 1, wherein the subsea enclosure comprises at least one of an input penetrator and an input connector for the power input.

10. The subsea switchgear of claim 1, wherein the subsea switchgear is adapted to distribute AC electric power at a voltage level within the range of about 500 V to about 10,000 V.

11. The subsea switchgear of claim 1, wherein the contactor is a no-load contactor adapted to be operated only when the power supply to the subsea switchgear is disconnected.

12. The subsea switchgear of claim 1, wherein the subsea switchgear is configured to directly supply the AC electrical power received at the power input to the respective one of the at least two power outputs without any conversion.

13. The subsea switchgear of claim 1, wherein the subsea switchgear does not include a power conversion device including a transformer or a frequency converter or a variable frequency drive.

14. The subsea switchgear of claim 1, further comprising a control unit adapted to control the switching state of the plurality of contactors.

15. The subsea switchgear of claim 14, wherein the control unit is configured to have a mode of operation to control the plurality of contactors so as to connect the power input subsequently to a different on of the at least two power outputs for an amount of time, while the remaining of the at least two power outputs are disconnected from the power input.

16. A pipeline heating system comprising:
the subsea switchgear of claim 1;
a plurality of heating units, each of the plurality of heating units being configured to heat a pipeline section, wherein a respective one of the heating units is connected to a respective one of the at least two power outputs of the subsea switchgear.

17. A subsea power distribution system for distributing electrical power to plural subsea loads, the plural subsea loads comprising electric motors, wherein the subsea power distribution system comprises the subsea switchgear of claim 1.

18. The subsea switchgear of claim 2, wherein the plurality of contactors are located in a chamber filled with an ester-based dielectric liquid or an oil.

19. The subsea switchgear of claim 3, wherein the subsea switchgear comprises, for each of the at least two power outputs, a chamber in which the respective contactor for the respective one of the at least two power outputs is arranged and which is filled with an ester-based dielectric liquid or an oil.

20. The subsea switchgear of claim 6, wherein the intermediate enclosure comprises a liquid tight or liquid permeable membrane as the flexible portion.

21. The subsea switchgear of claim 5, wherein the chambers comprises the respective contactors for all phases of the respective one of the at least two power outputs.

22. The subsea switchgear of claim 6, wherein the chambers comprises the respective contactors for all phases of the respective one of the at least two power outputs.

23. The subsea switchgear of claim 10, wherein the subsea switchgear is adapted to distribute AC electric power at a voltage level within the range of about 1,000 V to about 7,000 V.

24. A pipeline heating system comprising:
the subsea switchgear of claim 2;
a plurality of heating units, each of the plurality of heating units being configured to heat a pipeline section, wherein a respective one of the heating units is connected to a respective one of the at least two power outputs of the subsea switchgear.

25. A pipeline heating system comprising:
the subsea switchgear of claim 3;
a plurality of heating units, each of the plurality of heating units being configured to heat a pipeline section, wherein a respective one of the heating units is connected to a respective one of the at least two power outputs of the subsea switchgear.

26. A pipeline heating system comprising:
the subsea switchgear of claim 4;
a plurality of heating units, each of the plurality of heating units being configured to heat a pipeline section, wherein a respective one of the heating units is connected to a respective one of the at least two power outputs of the subsea switchgear.

27. A pipeline heating system comprising:
the subsea switchgear of claim 5;
a plurality of heating units, each of the plurality of heating units being configured to heat a pipeline section, wherein a respective one of the heating units is connected to a respective one of the at least two power outputs of the subsea switchgear.

28. A subsea power distribution system for distributing electrical power to plural subsea loads, the plural subsea loads comprising electric motors, wherein the subsea power distribution system comprises the subsea switchgear of claim 2.

29. A subsea power distribution system for distributing electrical power to plural subsea loads, the plural subsea loads comprising electric motors, wherein the subsea power distribution system comprises the subsea switchgear of claim 3.

30. A subsea power distribution system for distributing electrical power to plural subsea loads, the plural subsea loads comprising electric motors, wherein the subsea power distribution system comprises the subsea switchgear of claim 4.

31. A subsea power distribution system for distributing electrical power to plural subsea loads, the plural subsea loads comprising electric motors, wherein the subsea power distribution system comprises the subsea switchgear of claim 5.

32. The subsea switchgear of claim 1, wherein the subsea switchgear is for switching the power supply to a plurality of subsea loads.

33. The subsea switchgear of claim 2, wherein the subsea switchgear is for switching the power supply to a plurality of subsea loads.

34. The subsea switchgear of claim 3, wherein the subsea switchgear is for switching the power supply to a plurality of subsea loads.

35. A method of operating a subsea switchgear, comprising:
receiving AC electrical power at a power input;
distributing AC electrical power to two or more power outputs via a power distribution bus; and
switching power supply to the two or more power outputs via at least two contactors, each of the at least two contactors being connected between a respective one of the at least two power outputs and the power distribution bus, wherein the at least two contactors are solenoid contactors and wherein the at least two contactors are submerged in a dielectric liquid.

* * * * *